United States Patent [19]
Apple, Sr.

[11] 3,828,414
[45] Aug. 13, 1974

[54] TUBE JOINING SYSTEM

[75] Inventor: Charles N. Apple, Sr., Greensboro, N.C.

[73] Assignee: Metafab Industries, Inc., Greensboro, N.C.

[22] Filed: Sept. 27, 1973

[21] Appl. No.: 401,363

Related U.S. Application Data

[63] Continuation-in-part of Ser. No. 219,754, Jan. 21, 1972, abandoned.

[52] U.S. Cl. ................................. 29/200 B, 29/513
[51] Int. Cl. ...................... B23p 19/00, B23p 11/00
[58] Field of Search .. 29/200 B, 513, 200 R, 200 H, 29/155 R, 155 C

[56] References Cited
UNITED STATES PATENTS

| | | | |
|---|---|---|---|
| 1,269,144 | 6/1918 | Williamson | 29/513 X |
| 1,630,338 | 5/1927 | Gail | 29/513 X |
| 2,969,754 | 1/1961 | Wilson | 29/513 X |
| 2,970,371 | 2/1961 | Cardani et al. | 29/203 X |
| 3,278,880 | 10/1966 | Lewis et al. | 29/513 X |
| 3,364,557 | 1/1968 | Ashworth et al. | 29/513 X |

Primary Examiner—Thomas H. Eager
Attorney, Agent, or Firm—David Rabin

[57] ABSTRACT

A tool, for securing together a first member having legs thereon, and a second tubular member for receiving the legs through openings provided therein. The tool includes inclined cam surfaces or inclined rollers which are adapted to be directed through the tubular member for engaging and deforming the legs.

15 Claims, 14 Drawing Figures

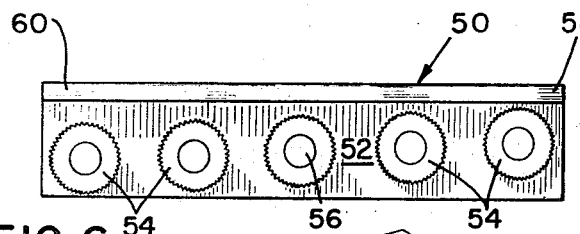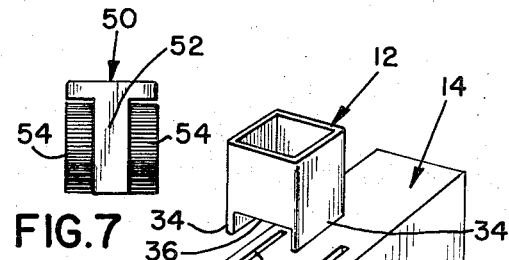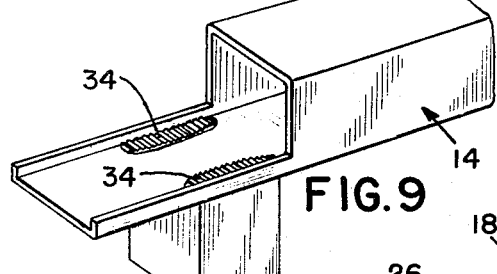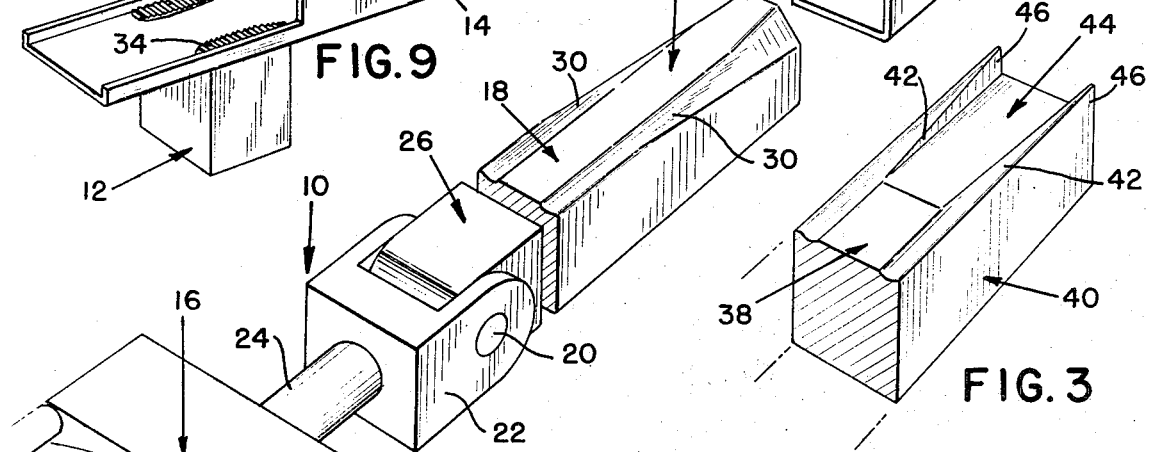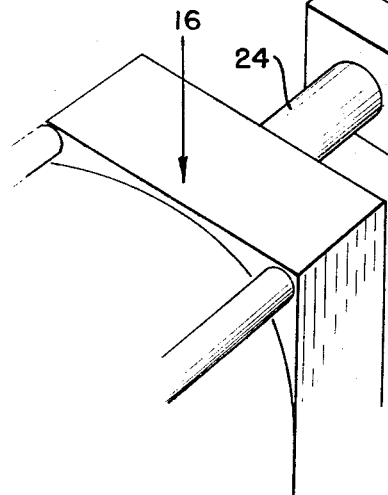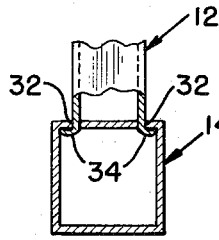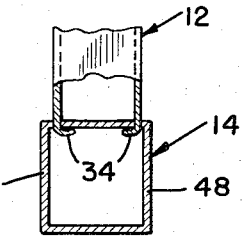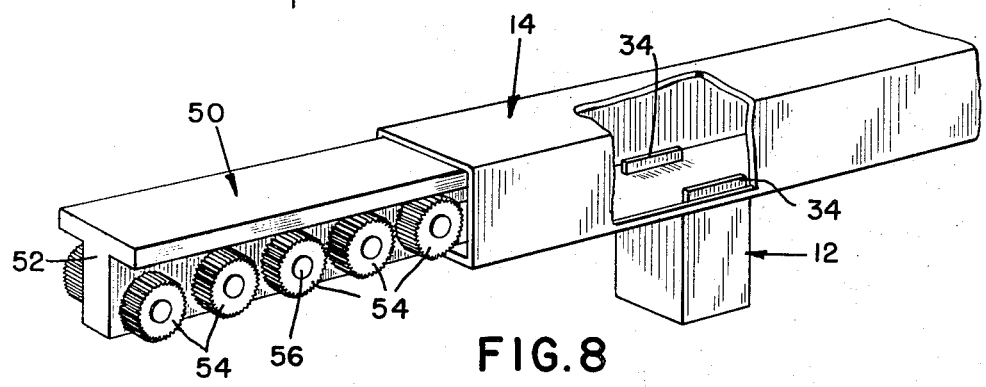

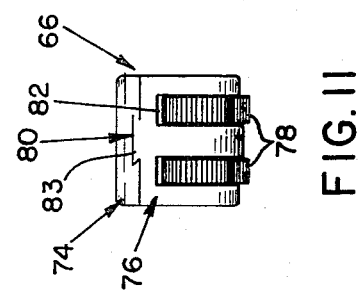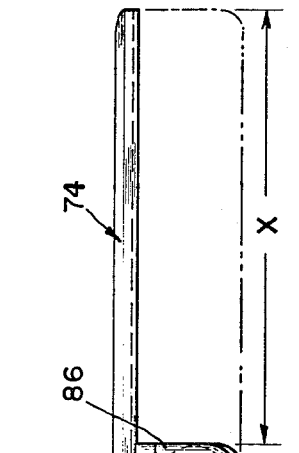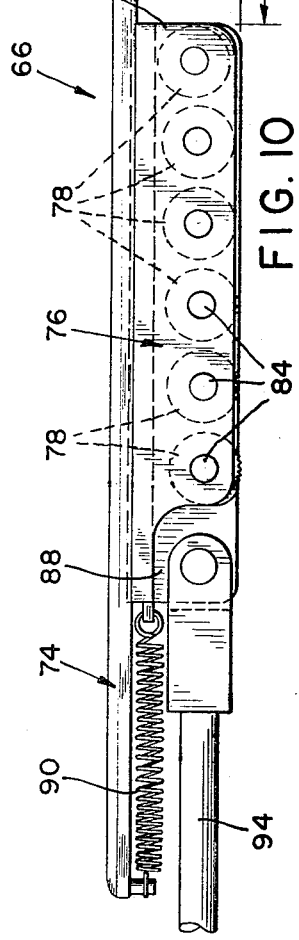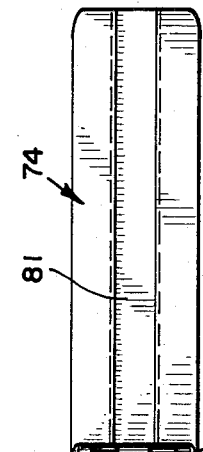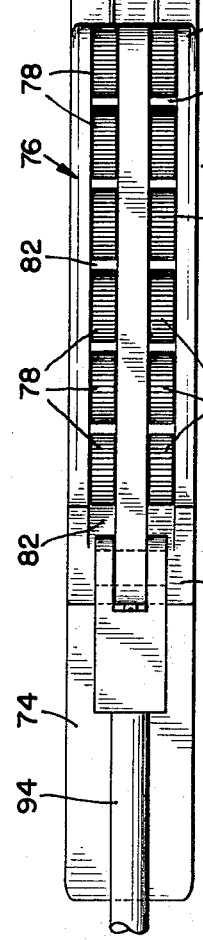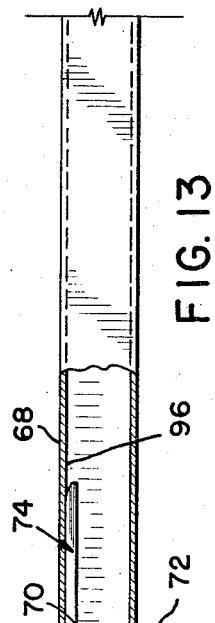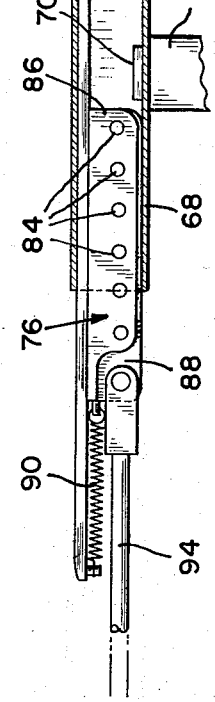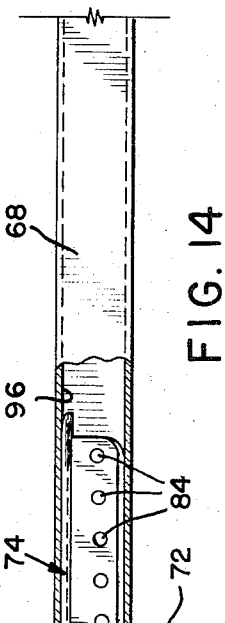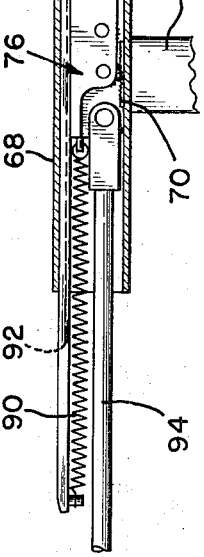

3,828,414

TUBE JOINING SYSTEM

This application is a continuation-in-part of U.S. patent application Ser. No. 219,754 filed January 21, 1972, now abandoned.

BRIEF SUMMARY AND OBJECTS OF THE INVENTION

The present invention relates to the joining together of a tubular member with another member and more particularly to a tool for joining together the two members in an angular relationship.

Briefly, the tools disclosed by the present invention permit a tubular member to be joined to a second member, which may or may not be tubular in cross section, in a rigid manner without welding, brazing, etc. Preferably the first tubular member has spaced openings formed therein by punching or other suitable means while the stem member, which may be tubular, has legs spaced therefrom to conform to and be received within the tubular member openings. A tool of wedge shape or other suitable shape is forced through the tubular member for deforming the legs and rigidly securing the tubular member and the stem member in assembled relation.

The tool may be provided with spaced, inclined cam surfaces for deforming the leg members inwardly or outwardly, or the tool may be provided with a series of inclined, knurled rollers for compressing and deforming the leg members. The tools may be forced through the tubular members by a fluid cylinder or other suitable manual or power means.

One of the primary objects of the invention is the provision of a novel tool for rigidly joining first and second tubular members in angular relationship.

Another object of the invention is the provision of a system for readily and conveniently joining two members in angular relationship without welding.

Other objects and advantages of the invention will become apparent when considered in view of the following detailed description.

BRIEF DESCRIPTION OF THE FIGURES

FIG. 1 is a perspective view of a wedge-shaped tool secured to a ram and adapted to be inserted into a square tubing member for deforming the legs of a stem member for subsequent securement thereto;

FIG. 2 is a fragmentary, perspective view illustrating the manner of inserting the legs of a stem member into a tubing member for securement thereto;

FIG. 3 is a fragmentary, perspective view of another embodiment of a tool for deforming the legs of a stem member;

FIG. 4 is a sectional view of a tube member and stem member after deforming the legs of the stem member outwardly by the tool of FIG. 1;

FIG. 5 is a sectional view of a tube member and a stem member after deforming the stem member legs inwardly with the tool of FIG. 3;

FIG. 6 is a side elevational view of still another embodiment of a tool for deforming the stem member legs;

FIG. 7 is an end elevational view of the tool of FIG. 6;

FIG. 8 is a fragmentary, perspective view, with portions removed, of a tubular member adapted to be coupled to a stem member upon actuation of the deforming tool through the tubular member;

FIG. 9 is a fragmentary, perspective view of a joined stem and tube members, with parts removed, after deforming the stem member legs;

FIG. 10 is a side elevational view of a further embodiment of a tool for deforming the stem member legs;

FIG. 11 is an end elevational view of the tool taken from the right side of FIG. 10;

FIG. 12 is a plan view of the tool of FIG. 10;

FIG. 13 is a fragmentary side elevational view, with portions removed, of two members to be joined together by the tool of FIG. 10, and with the tool being inserted into a tubular member and just prior to engagement of the series of inclined, knurled rollers with the leg members of a second member; and FIG. 14 is a view similar to FIG. 13 and with the knurled rollers being directed passed the leg members to deform the legs.

DETAILED DESCRIPTION OF THE INVENTION

Referring to the drawing, and particularly to FIGS. 1, 2 and 4, reference numeral 10 designates a mechanism for securing members 12 and 14 in rigidly assembled relation. The mechanism 10, FIG. 1, comprises a conventional, double action fluid cylinder arrangement 16 for displacing a tool member 18 a prescribed distance. The particular size of the tool 18 may vary depending upon the size of the tubular member 14. The tool may be secured, through a pin 20 and a generally U-shaped member 22, to the rod 24 of fluid cylinder arrangement 16.

The tool 18, has one end 26 of a generally square or rectangular cross section, generally conforming to the cross-sectional configuration of tubular member 14 thereby serving to guide the tool through member 14 upon actuation of fluid cylinder 16. The forward upper end 28 of tool 18 has spaced, inclined cam surfaces 30 which taper or vary from the end 28 towards end 26. As shown by FIG. 1, the cam surfaces taper from approximately 45° with respect to the horizontal at end 28 to a generally flattened condition as shown adjacent tool end 26.

Referring to FIG. 2, the tubular member 14 is provided with spaced, parallel slots or openings 32 which are adapted to receive the spaced leg members 34 of stem member 12. The slots 32 may be formed within tubular member 14 as by punching, while the spaced legs 34 of stem member 12 are formed by cutting away portions of the end of the stem member. After inserting the leg members 34 into the slots 32 with the surfaces 36 abutting the member 14, the legs 34 may be deformed to fasten members 12 and 14 together.

As shown by FIG. 4, the wedge-shaped tool 18 is forced through member 14 thus deforming and bending the leg members 34 outwardly to secure members 12 and 14 together. The cam surfaces 30 gradually deform the leg members from the FIG. 2 position to the FIG. 4 position upon displacement of the tool 18 passed the leg members.

FIG. 3 discloses the forward end 38 of a modified embodiment of the tool 40 having inclined, upstanding, spaced camming surfaces 42 at the upper, forward end thereof. The configurations of the cam surfaces 42 are such that the legs 34 are bent inwardly, as illustrated by FIG. 5, for firmly and rigidly clamping the stem member 12 to the tubular member 14. It is to be noted that a portion 44 of the tool intermediate cam surfaces 42 is tapered downwardly for receiving and facilitating turning of leg members 34 inwardly. In movement of tool 40 through member 14, the outermost tips 46 of the cam surfaces move between the leg members 34 and the side walls 48 of tubular member 14 gradually forcing the members 34 inwardly.

FIGS. 6–9 relate to still another embodiment of a tool 50 for deforming the leg members 34. The modified tool 50 comprises an elongated, generally T-shaped member 52 having a series of spaced rollers 54 provided on each side thereof. The height and width of the T-shaped member 52 generally corresponds to the space within the tubular member 14. On each side of the T-shaped member 52, the rollers 54, which are rotatably mounted upon shafts 56, are gradually subsequently lowered or inclined, with respect to the bottom of the T-shaped member 52 from the forward end 58 to the rearward end 60 of the tool 50. While the particular spacing of the rollers 54 may vary, in a preferred embodiment of the invention, five rollers are located on each side of the tool with each succeeding roller being mounted approximately 0.020 inches below the preceding roller. The rollers may be of tool steel having knurls of 20 pitch.

As illustrated by FIG. 8, the leg members 34 normally are positioned as shown before being deformed by the tool 50. FIG. 9 shows the leg members 34 after being deformed and compressed by the rollers 54 to secure members 12 and 14 together. The tool 50 may be suitably secured to a fluid cylinder arrangement 16 for displacement through tubular member 14.

FIGS. 10–14 relate to a further embodiment of a tool 66 which is adapted to be inserted within a tubular member 68 for deforming the leg members 70 of a second member 72 for rigidly securing the members 68, 72 together.

The tool 66 includes an elongated member 74 slidably supporting a block 76 which rotatably supports a plurality of knurled rollers 78, the rollers 78 being of the type described in conjunction with the tool of FIGS. 6–8. The elongated member 74 and the block 76 are formed of hardened metal and slidably interlocked by a dovetail coupling 80 consisting of a groove 81 and a tenon 83, as shown most clearly by FIG. 11. The block 76 is provided with spaced, parallel slots 82 for receiving the series of rollers 78 in spaced relation.

The height and width of the tool 66 generally corresponds to the space defined by the tubular member 68. The rollers 78, which are mounted upon shafts 84 and aligned with the leg members 70 of tubular member 72, are gradually, subsequently inclined from the forward end 86 to the rearward end 88 of the tool 66 as previously referred to in the description of the embodiment of FIGS. 6–8, and the leg members 70 are progressively deformed upon displacement of the block 76 passed the leg members 70. The leg members would be deformed by the rollers 78 substantially as shown by FIG. 9.

The block 76 normally is positioned upon the elongated member 74 as shown by FIGS. 10, 12 and 13. A spring 90 having opposite ends secured to the member 74 and block 76, respectively, retains the block against a shoulder 92 defining the end of groove 81.

The tool 66 may be urged into the tubular member 68 by suitable means connected to a rod 94 which, in turn, is attached to the block 76. The tool 66 initially is introduced into member 68 with the elongated member 74 and the block 76 moving as a unit due to the spring 90. As the forward rollers 78 engage the leg members 80, the elongated member 74 is urged against the inner wall 96 of the tubular member 68 and thereby freezes to the tube 68. The block 76 continues to slide upon the member 74 due to the force applied by rod 94 and the rollers 78 gradually and progressively deform the leg members to interlock members 68, 72.

The metal of the tubular members 14 and 68 normally is relatively soft and in certain instances galling occurs when a tool frictionally slides within a member 14 or 68. The tool 66 of FIGS. 10–14 eliminates galling since the elongated member 74 freezes against the inner wall 96 of the tube 68 as the rollers 78 move over and deform the leg members 70. During the deforming of the leg members, sliding friction occurs only between the hardened metals of the block 76 and the elongated member 74, and not between the member 74 and the relatively soft metal of the tube 68.

I claim:

1. A tool for joining members together, one of which members is tubular and has a walled exterior and an axial opening for cooperatively receiving and guiding said tool, said walled exterior having at least one opening for cooperatively receiving and seating a leg member projecting from a second member, said tool having a body portion for being cooperatively received in said axial opening of said one member, means on said body portion for engaging and progressively deforming said projecting leg member protruding into said axial opening upon axial displacement of said tool through the axial opening of said walled exterior member to prevent removal of said leg member from said opening and said walled exterior.

2. A tool for joining two members as recited in claim 1, and further including means for urging said body portion through the member having the axial opening.

3. A tool for joining two members as recited in claim 1, said means on the body portion, for engaging and deforming said projecting leg member, comprising cam surfaces.

4. A tool for joining two members as recited in claim 3, wherein said cam surfaces taper from approximately a 45° angle with respect to the horizontal at a forward portion of said body portion to a generally flattened condition adjacent rear portion.

5. A tool for joining two members as recited in claim 3, said cam surfaces including upstanding, spaced portions at an upper forward portion of said body portion.

6. A tool for joining two members as recited in claim 5, said cam surfaces further including a downwardly and forwardly tapering cam portion intermediate said upstanding spaced portions.

7. A tool for joining two members as recited in claim 1, wherein said body portion comprises a generally T-shaped member having forward and rearward portions.

8. A tool for joining two members as recited in claim 7, said T-shaped member having series of spaced rollers provided on each side thereof.

9. A tool for joining two members as recited in claim 8, wherein the rollers, on each side of the T-shaped member, are gradually, subsequently lowered, with respect to the bottom of the T-shaped member from the forward end to the rearward end of the T-shaped member.

10. A tool for joining two members as recited in claim 9, wherein the rollers are knurled.

11. A tool for joining two members as recited in claim 1, wherein said body portion includes a first member adapted to be located within the axial opening of said tubular member and a second member displaceable relative to said first member.

12. A tool for joining two members as recited in claim 11, wherein series of inclined, spaced rollers are provided upon said displaceable, second member.

13. A tool for joining two members as recited in claim 12, wherein said first member freezes against an interior surface of said tubular member upon displacement of said rollers passed said leg member.

14. A tool for joining two members as recited in claim 12, wherein said rollers are progressively inclined outwardly of said body portion second member from the forward to the rearward ends thereof to progressively deform the leg member.

15. A tool for joining two members as recited in claim 11, wherein said body portion first and second members are slidably displaceable relative to each other, and further including biasing means normally retaining said body portion second member in a selected position relative to said body portion first member.

* * * * *